J. L. ALLEN.
PUZZLE.
APPLICATION FILED MAY 8, 1915.

1,169,593.

Patented Jan. 25, 1916.

WITNESSES:
Frank C. Palmer.
J. E. Larsen

INVENTOR
John L. Allen
BY Munn & Co
ATTORNEYS

UNITED STATES PATENT OFFICE.

JOHN L. ALLEN, OF SAN DIEGO, CALIFORNIA, ASSIGNOR TO HUGH ALLEN, OF HAMILTON, ONTARIO, CANADA.

PUZZLE.

1,169,593.   Specification of Letters Patent.   Patented Jan. 25, 1916.

Application filed May 8, 1915. Serial No. 26,770.

*To all whom it may concern:*

Be it known that I, JOHN L. ALLEN, a subject of the King of Great Britain, and a resident of San Diego, in the county of San Diego and State of California, have invented certain new and useful Improvements in Puzzles, of which the following is a specification.

My invention relates to puzzles, of the class wherein one or more objects are to be guided into desired receivers, and the main object thereof is to provide a puzzle of this class wherein the movable object consists of a sphere concealed by an inverted box representing any well known vehicle, animal, or the like, and which box serves to affect the normal movement of the sphere and is itself affected thereby to defeat efforts made to deposit said movable object within a suitable repository provided therefor.

A further object is to form the box of slightly less depth than the diameter of the sphere, whereby the end or side of the box in contact with the surface over which it moves is constantly changed to defeat efforts made to guide the object.

A further object is to make the box of greater length and width than the diameter of the sphere in order to permit a constantly changing relationship to exist between the box and sphere.

A further object is to interpose a partition at a point intermediate the length of the box in order to receive the impulse of the sphere and, not being at the extreme end of the object, will cause the object to gyrate upon the sphere as a pivot, thereby defeating any effort to point the object in a desired direction or to maintain it so pointed if already headed in a desired direction.

The movable object in reality consists in a cover for the sphere which, with the sphere as one support, is supported at two other points which are constantly changing, in other words a three-legged object two of the legs of which are constantly being changed as an effort is made to move the object in a desired direction.

My invention is fully described in the following specification, of which the accompanying drawings form a part, in which like characters refer to like parts in each of the views, and in which:—

Figure 1:
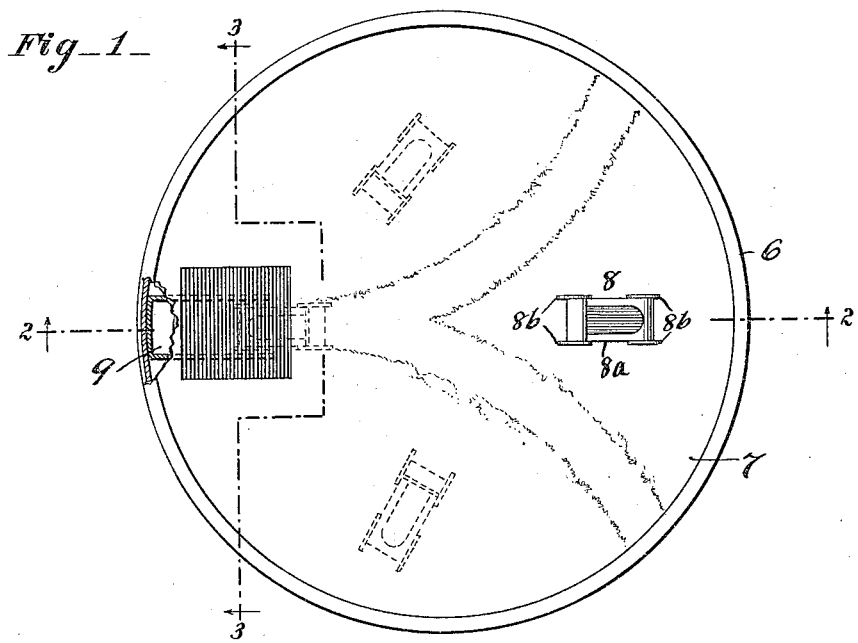
Figure 2:
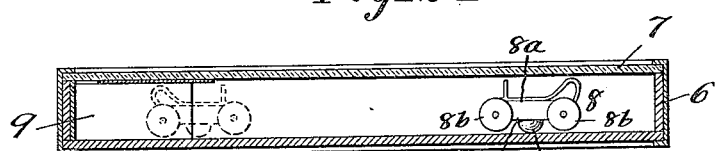
Figure 3:
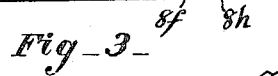
Figure 4:
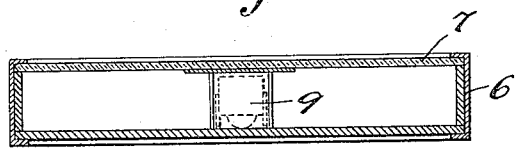
Figure 4:
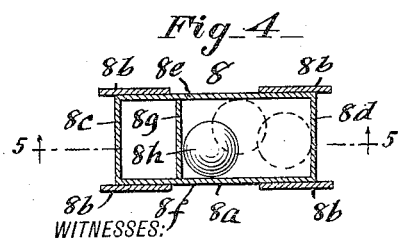
Figure 5:
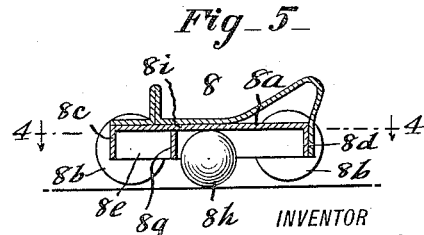

Figure 1 is a plan view of one embodiment of my invention ready for use and partly in section; Fig. 2 is a section taken on the line 2—2 of Fig. 1; Fig. 3 is a section taken on the line 3—3 of Fig. 1; Fig. 4 is an enlarged section of the movable object taken on the line 4—4 of Fig. 5; and Fig. 5 is a similar section taken on the line 5—5 of Fig. 4.

In the drawings forming a part of this application I have shown one form of my invention, consisting of a circular casing 6 having a transparent cover 7, a movable object 8, and a repository 9 into which it is desired to direct the object 8. The casing 6 may be made in any desired manner and of any desired shape, the only limitation being that it is desirable and even necessary to have the interior height thereof only slightly greater than the height of the object 8 in order to prevent overturning of said object or the escape of the sphere thereunder from its concealing box. The repository 9 is formed to represent a garage in the present showing, and the object 8 to represent an automobile, said object comprising an inverted box or body $8^a$ having representations of wheels $8^b$ thereon, four in number, dependent end walls $8^c$ and $8^d$, side walls $8^e$ and $8^f$, and a transverse partition $8^g$, said body resting upon a ball $8^h$ of slightly greater diameter than the distance between the lower edges of the wheels and the under side of the bottom $8^i$ of the body in order that all of said wheels will not be able to rest upon the floor of the casing 6 at one time, in fact only two end or two side wheels will rest upon said floor at one time, the body $8^a$ being otherwise supported by the ball $8^h$.

The aim of the player is to direct the object 8 into the garage 9, the latter being made of a width just sufficient to admit the object when headed or backed directly thereinto, whereby the difficulty of moving the object into the garage is correspondingly increased, the object being moved in desired directions by tilting the casing floor accordingly as in all puzzles of this class.

The body of the object 8 may be exactly balanced on the ball at times but, if the casing be tilted to cause the object to move in the direction in which it is headed, the front end immediately drops and the front wheels serve as a drag and the automobile swings around headed in an entirely different direction, possibly end for end, depending on the direction of tilting or the axis or axes on which it is tilted. If the tilting should be on two axes simultaneously, or be done on a constantly changing axis, the ball may pass to one side or the other of the body $8^a$, to one end or the other, or to one corner or the other, thus varying the particular wheels which bear against the casing floor and correspondingly varying the direction of the dragging effect on the movable object, whereby it is practically impossible to head the object in a desired direction, or to move it even a fraction of an inch in such direction and maintain the same head on or tail on. Because of the position of the partition $8^g$, the ball is prevented from moving to the corresponding end of the body $8^a$, but is instead stopped approximately midway of the length of the body, thereby permitting the body to gyrate upon said ball as a pivot.

It is essential to have the ball of greater diameter than the normal distance between the under side of the bottom of the body and the casing floor whereby only one side or end of the body may touch said floor at a time, resulting in constantly changing dragging effect on the ball and correspondingly swinging the body on said ball as a pivot.

As will be understood, I do not confine myself to the representation of any particular vehicle, animal, or other object, nor to an inclosure such as the garage shown, as I may cause the movable object to represent a fly, spider, a mouse, etc., and vary the design of the casing accordingly, as a web for the spider, a hole for the mouse, etc., but I will employ the heavy ball, as of steel, and the inverted box thereover and not touching the floor at more than one side because of the diameter of the ball.

I may or may not use the partition, although this adds to the difficulty of attaining the desired result, or I may employ a partition in each end of the body to still further increase the difficulty of success, these all being determined by the form of the puzzle.

Having fully described my invention, what I claim as new, and desire to secure by Letters Patent, is:—

1. A puzzle, comprising a casing provided with a smooth floor and a transparent cover, and a movable object therein consisting of a ball and an inverted box concealing the same of less depth than the diameter of said ball though of greater width and length than the diameter of said ball.

2. A puzzle, comprising a casing provided with a smooth floor and a transparent cover, and a movable object therein consisting of a ball and an inverted box concealing the same of less depth than the diameter of said ball though of greater width and length, and a partition in said box limiting the relative movements of said ball and box whereby said box may at times be supported by said ball clear of said floor.

3. A puzzle, comprising a casing provided with a smooth floor and a transparent cover, an inclosure of definite size between said floor and cover and provided with an opening at one side thereof, an angular object in said casing of slightly less width than said opening but of greater length, and a ball beneath said object of a diameter exceeding the depth thereof.

In testimony whereof I have signed this specification in the presence of two subscribing witnesses.

JOHN L. ALLEN.

Witnesses:
 H. J. LANG,
 EDMOND FERRIS.

Copies of this patent may be obtained for five cents each, by addressing the "Commissioner of Patents, Washington, D. C."